(12) United States Patent
Kifuku

(10) Patent No.: US 6,600,983 B2
(45) Date of Patent: Jul. 29, 2003

(54) STEERING CONTROL APPARATUS

(75) Inventor: Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/839,839

(22) Filed: Apr. 24, 2001

(65) Prior Publication Data

US 2002/0069003 A1 Jun. 6, 2002

(30) Foreign Application Priority Data

Dec. 1, 2000 (JP) ..................... P.2000-366808

(51) Int. Cl.[7] ................................. B62D 5/04
(52) U.S. Cl. ......................... 701/41; 180/443
(58) Field of Search ............. 701/41; 180/443, 180/446; 307/10.1

(56) References Cited

U.S. PATENT DOCUMENTS

| | | | | |
|---|---|---|---|---|
| 4,624,334 A | * | 11/1986 | Kelledes et al. ............ 180/446 |
| 5,504,679 A | * | 4/1996 | Wada et al. ................. 180/446 |
| 5,552,684 A | * | 9/1996 | Wada et al. ................. 180/404 |
| 5,717,310 A | * | 2/1998 | Sakai et al. ................. 307/10.1 |
| 5,796,175 A | * | 8/1998 | Itoh et al. ................... 307/10.1 |
| 6,052,633 A | * | 4/2000 | Fukuyama et al. ......... 180/400 |
| 6,266,591 B1 | * | 7/2001 | Wilson-Jones et al. ..... 180/421 |
| 6,400,589 B2 | * | 6/2002 | Abo et al. ................... 323/267 |
| 6,404,150 B1 | * | 6/2002 | Nehl et al. .................... 318/34 |

FOREIGN PATENT DOCUMENTS

JP        2000-168605        6/2000

* cited by examiner

*Primary Examiner*—Michael J. Zanelli
(74) *Attorney, Agent, or Firm*—Sughrue Mion, PLLC

(57) ABSTRACT

A steering control apparatus includes a first power supply, a second power supply for outputting a voltage lower than the voltage of the first power supply, a motor for generating an auxiliary steering power, a controller for controlling the motor, and a driver for driving the motor in response to the output of the controller, wherein power is supplied from the first power supply to the driver and that power is supplied from the second power supply to the controller.

6 Claims, 4 Drawing Sheets

STEERING CONTROL APPARATUS

BACKGROUND OF THE INVENTION

1. Field of the Invention

The present invention relates to a vehicle-steering control apparatus such as an electric power steering apparatus and an automatic steering apparatus.

2. Description of the Related Art

Heretofore, it has been common to increase power supply voltage in order to raise the efficiency of large-power vehicular equipment. Although power supply (battery) voltage in passenger cars, for example, has generally been set at 12V, power supply voltage in commercial cars such as trucks has been set at 24V as they need greater power supply. It has also been considered to set power supply voltage at 42V even in passenger cars as equipment mounted therein increases. Moreover, a power supply capable of supplying voltage as high as 200V or 300V is even mounted in electric cars.

There is a known electric power steering control apparatus to be mounted in a high-voltage car system as disclosed in IP-A-2000-168605, for example. Such an electric power steering control apparatus has been designed for optimum motor operation in accordance with the power supply voltage and motor load current conditions by providing switching elements for the high potential side of a bridge circuit comprising two sets of driving means including a first driving means 321 corresponding to a first power supply (e.g., 24V) and a second driving means 322 corresponding to a second power supply (e.g., 12V). See FIG. 8, for example.

However, the problem in the aforementioned prior art steering control apparatus is that the apparatus tends to become complicated, thus resulting in a cost increase, because the number of switching elements in the bridge circuit increases and a plurality of driving circuits for driving these switching elements are also required.

SUMMARY OF THE INVENTION

An object of the present invention made to solve the foregoing problems is to provide an efficient steering control apparatus fit for use in vehicles with high-voltage power supply at 200V, 42V and 24V without incurring complication of the apparatus in structure and a cost increase.

A steering control apparatus according to the invention comprises a first power supply, a second power supply for outputting a voltage lower than the voltage of the first power supply, a motor for generating an auxiliary steering power, control means for controlling the motor, and driving means for driving the motor in response to the output of the control means, wherein power is supplied from the first power supply to the driving means and that power is supplied from the second power supply to the control means.

A steering control apparatus, wherein the second power supply is made a DC-DC converter which is operated by supplying power from the first power supply.

A steering control apparatus comprises a power supply, a motor for generating an auxiliary steering power, control means for controlling the motor, and driving means for driving the motor in response to the output of the control means, wherein a switching regulator is provided for lowering the output voltage of the power supply, and the control means is supplied with power via the switching regulator and that the driving means is supplied with power via the power supply.

The control means, the driving means and the switching regulator are housed in one and the same case.

A series regulator is provided between the switching regulator and the control means.

The control and driving means are electrically grounded.

The control and driving means are electrically insulated.

DETAILED DESCRIPTION OF THE PREFERRED EMBODIMENTS

Now, a description will be given of preferred embodiments of the invention with reference to the accompanying drawings.

Embodiment 1

Figure 1:
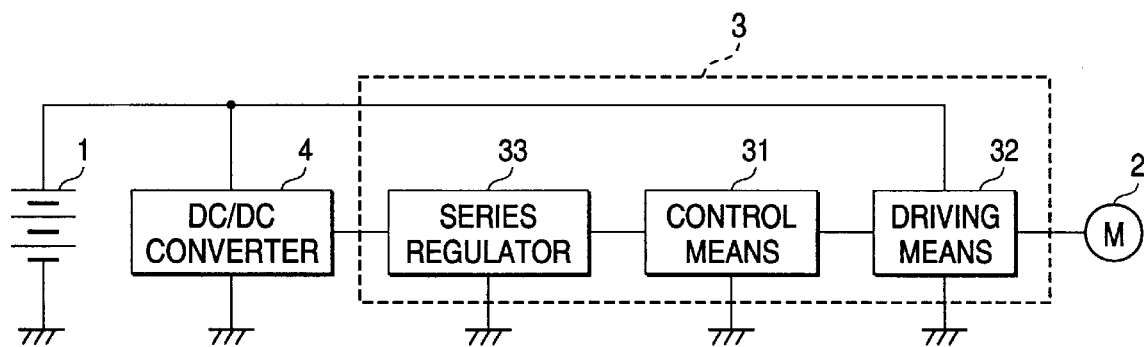
FIG. 1 is a block diagram of an electric power steering apparatus according to a first embodiment of the invention.

An embodiment of the present invention will now be described. FIG. 1 shows an embodiment of the invention, wherein reference numeral 1 denotes a power supply such as a battery; 2, a motor for increasing driver's steering power; 3, a control unit for controlling the motor 2; and 4, a DC-DC converter for inducing low voltage from the high-voltage power supply 1. The control unit 3 is equipped with a control means 31 for controlling the motor 2 so as to supplement the driver with suitable steering force in accordance with the driver's steering power, and a driving means 32 for driving the motor 2 according to the instruction from the control means 31.

Although the aforementioned power supply has generally been set at 12V for passenger cars and 24V for commercial cars such as trucks, adoption of 42V therefore is being considered now and a case where a power supply of 42V is adopted will be described.

As it is desirous to increase power supply voltage in order to raise the efficiency of large-power vehicular equipment as described above, microcontroller units (hereinafter called MCU) constituting control apparatus for controlling vehicular equipment are usually set to operate at 3.3V, 5V or 8V. In a case where a high voltage is supplied to a power supply circuit for supplying power to the control means 31, a voltage drop in the power supply circuit becomes greater, thus tending to increase voltage loss. According to this embodiment of the invention, a low voltage is supplied to the control means 31 via the DC-DC converter 4 as shown in FIG. 1 and a high voltage is directly supplied to the driving means 32 whereby to drive the motor 2 at the high voltage while preventing any loss in the power supply circuit of the control means 31. Thus, the power supply circuit can be driven with higher efficiency.

Figure 2:
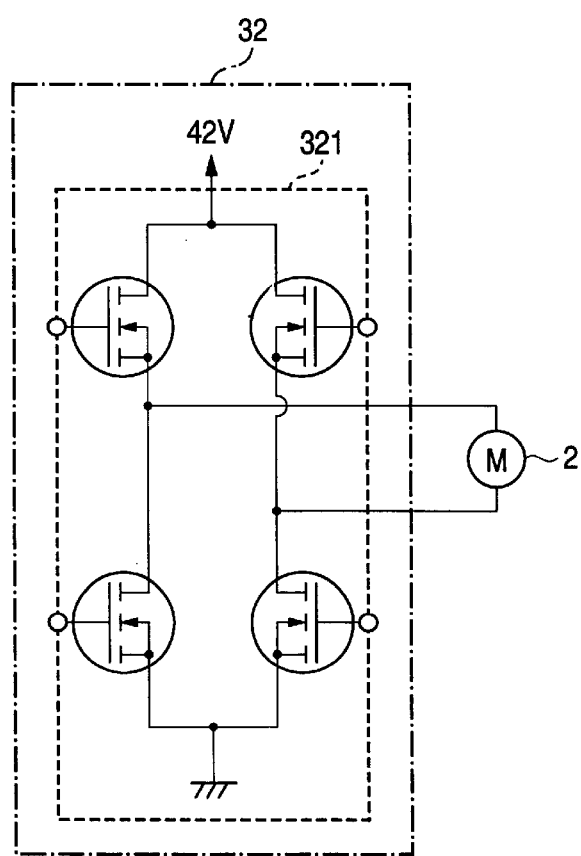
FIG. 2 is a block diagram showing the electric power steering apparatus according to the first embodiment of the invention.

According to this embodiment of the invention, only the high voltage (42V) is supplied from the power supply to drive the motor 2 and as shown in FIG. 2, only the first driving means 321 is required, so that any increase in not only the number of elements but also cost is made preventable.

Figure 3:
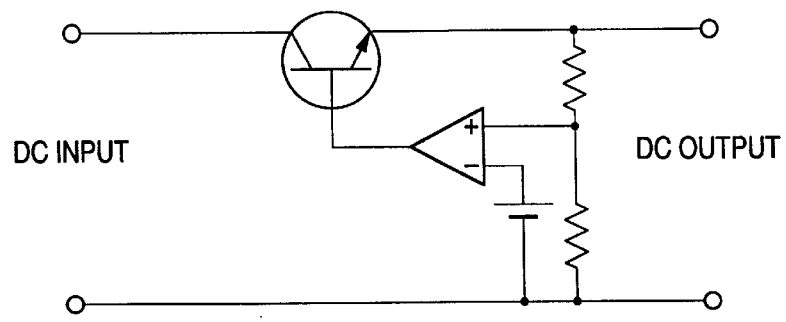
FIG. 3 is a block diagram showing a general series regulator.

Power is supplied to the control means 31 via a series regulator 33 according to this embodiment of the invention. As shown in FIG. 3, the series regulator 33 may be in a generally known form. Although the series regulator is inferior in efficiency to an ordinary one, it is superior in power supply stability. However, the efficiency problem of the series regulator remains unaffected because the DC-DC converter 4 is used for low-voltage conversion according to this embodiment of the invention. While power is stably supplied to the MCU of the control means 31, it is possible to the build a high-efficient system.

Vehicles are usually mounted with various control units for controlling their engines and the DC-DC converter 4 as mentioned above may be commonly used to supply a low voltage to them so as to simplify the vehicular power supply.

Embodiment 2

Figure 4:
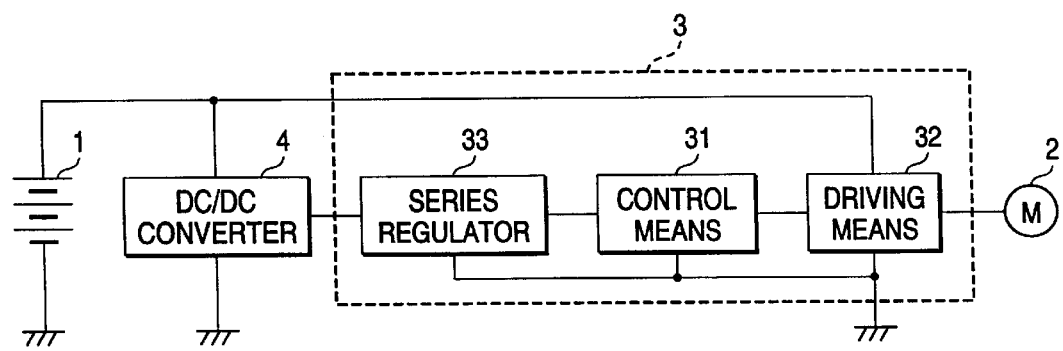
FIG. 4 is a block diagram of an electric power steering apparatus according to a second embodiment of the invention.

The second embodiment will be discussed with reference to FIG. 4. Although the control means 31, the driving means 32 and the series regulator 33 that constitute the control unit 3 have been grounded separately, they may be grounded after their grounding potentials are connected within the control unit 3 in order to obtain a more stable steering control apparatus.

In the first and second embodiments of the invention, a photocoupler may be used to electrically insulate the control means 31 supplied with the low voltage from the driving means 32 supplied with the high voltage whereby to obtain a steering control apparatus free from potential different between the respective grounding potential differences.

Embodiment 3

Figure 5:
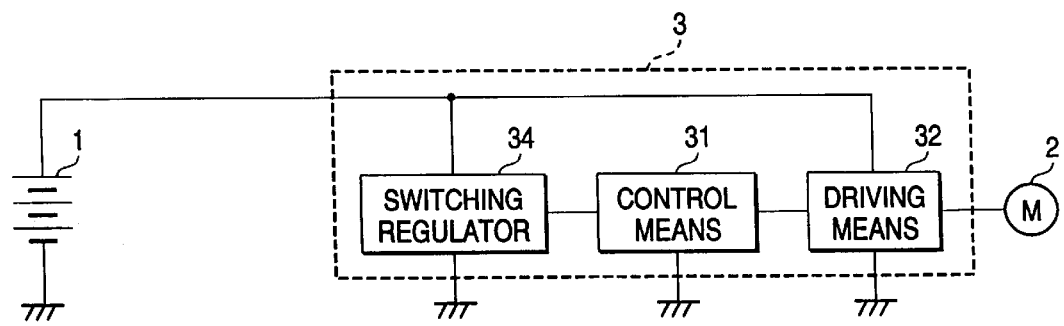
FIG. 5 is a block diagram of an electric power steering apparatus according to a third embodiment of the invention.
Figure 6:
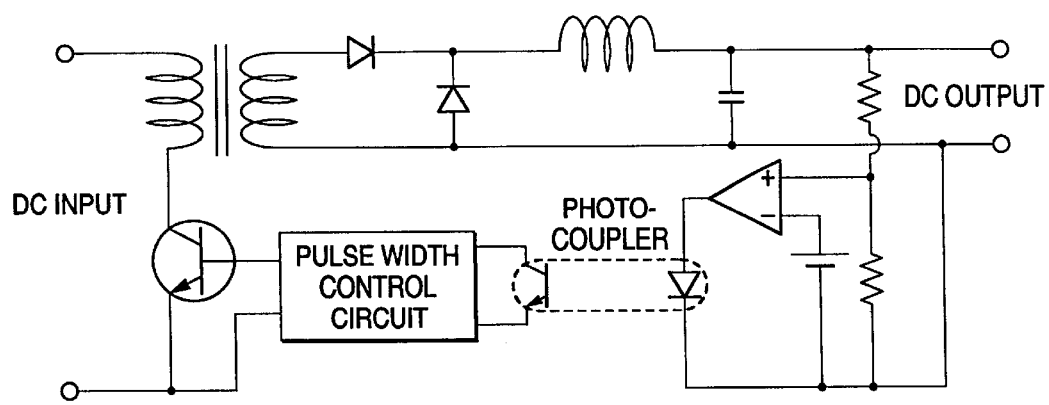
FIG. 6 is a block diagram of a general switching regulator.

A third embodiment 3 will be described with reference to FIG. 5. According to this embodiment of the invention, like reference characters designate like component parts in the first embodiment of the invention. According to this embodiment of the invention, the high-voltage of the power supply 1 is directly input to the control unit 3 and caused to branch off within the case of the control unit. Then the high voltage is directly supplied to the driving means 32, whereas what results from conversion of the high voltage into the low voltage by means of a switching regulator 34 is supplied to the control means 31. The switching regulator 34 may be formed as well known and shown in FIG. 6.

With the arrangement above, as any low voltage fit for the control means 31 is formable within the control unit 3, whatever variable vehicular voltages including 12V, 24V, 42V, 200V and the like become directly applicable without varying the apparatus construction. Thus, the steering control apparatus can be standardized. Moreover, as the number of harnesses for use in supplying power to the control unit 3 can be decreased, the steering control apparatus is made simple in construction.

Embodiment 4

Figure 7:
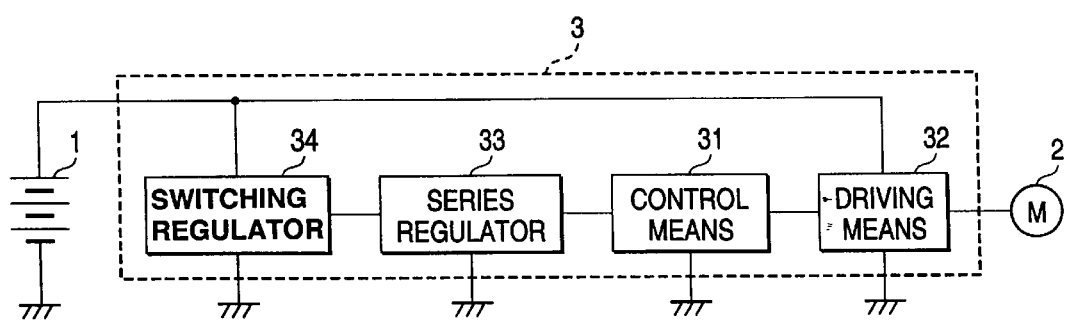
FIG. 7 is a block diagram showing an electric power steering apparatus according to a fourth embodiment of the invention.
Figure 8:
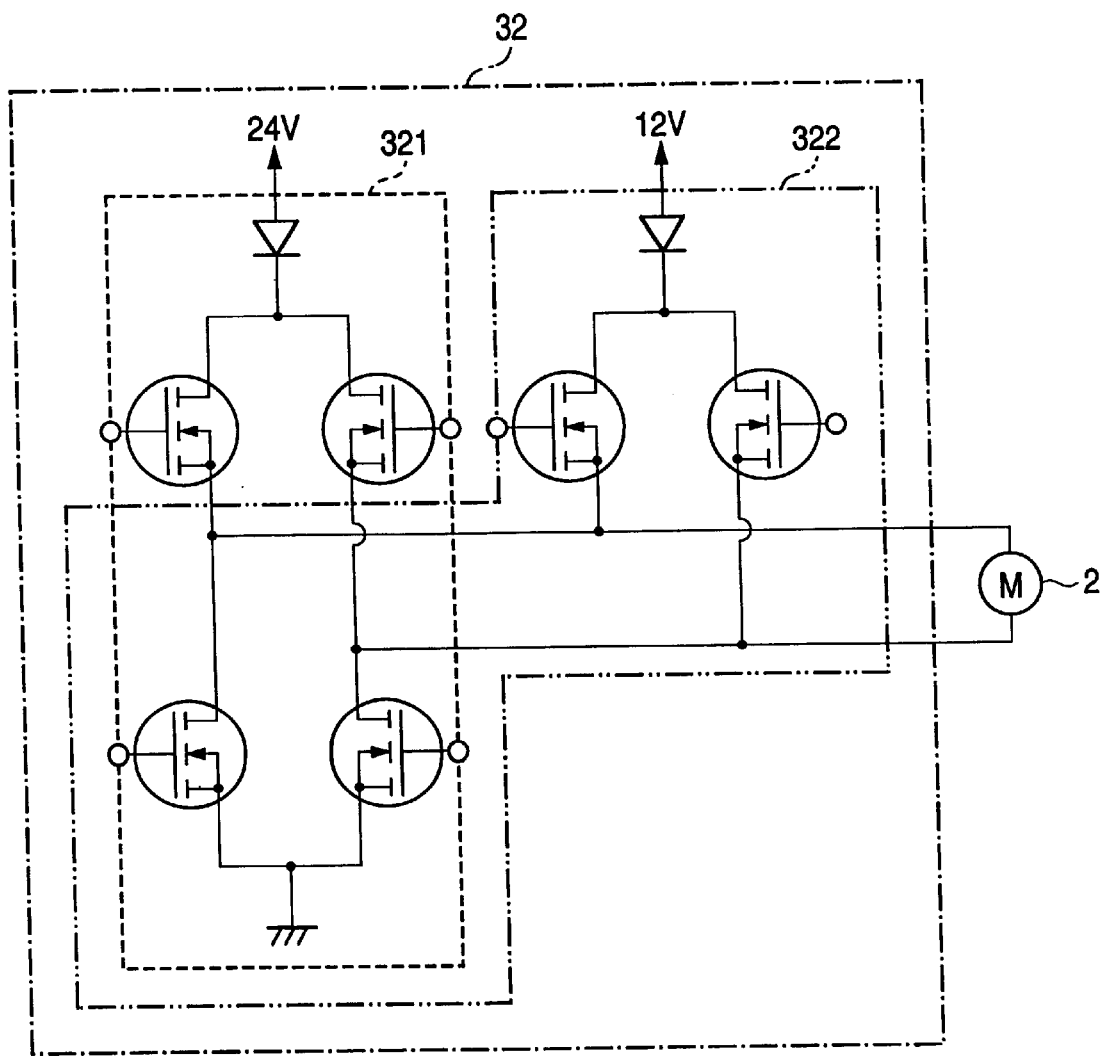
FIG. 8 is a block diagram showing the driving means of a conventional electric power steering apparatus.

Although power has been supplied from the switching regulator 34 to the control means 31 according to the third embodiment of the invention, because the switching regulator is generally lacking of stability, power may be supplied via the series regulator 33 to the control means 31 as shown in FIG. 7, whereby power can stably be supplied to the control means 31.

Although the series regulator 33 and the switching regulator 34 are supplied with a single voltage in each of the embodiments of the invention, a plurality of voltages may be supplied to the MCU or operating amplifiers.

The steering control apparatus according to the invention comprises the first power supply, the second power supply for outputting a voltage lower than the voltage of the first power supply, the motor for generating an auxiliary steering power, the control means for controlling the motor, and the driving means for driving the motor in response to the output of the control means, wherein power is supplied from the first power supply to the driving means and that power is supplied from the second power supply to the control means, so that highly efficient steering control apparatus becomes available without a cost increase.

The second power supply is made a DC-DC converter which is operated by supplying power from the first power supply, so that the vehicle commonly usable and mounted with 200V or 42V can be employed a highly efficient steering control apparatus without a cost increase.

The steering control apparatus comprises a power supply, a motor for generating an auxiliary steering power, control means for controlling the motor, and driving means for driving the motor in response to the output of the control means, so that a switching regulator is provided for lowering the output voltage of the power supply, and the control means is supplied with power via the switching regulator and that the driving means is supplied with power via the power supply, so that the vehicle commonly usable and mounted with 200V or 42V can be employed a highly efficient steering control apparatus without a cost increase.

The control means, the driving means and the switching regulator are housed in one and the same case. Thus, the steering control apparatus can be standardized as the number of harnesses for use in supplying power to the control unit can be decreased, the steering control apparatus is made simple in construction.

The series regulator is provided between the switching regulator and the control means, whereby stable power can be supplied to the control means.

The control and driving means are electrically grounded, so that a stable steering control apparatus becomes available.

The control and driving means are electrically insulated whereby to obtain a steering control apparatus free from potential different between the respective grounding potential differences.

What is claimed is:

1. A steering control apparatus comprising:
   a power supply;
   a motor for steering control;
   a controller for controlling said motor;
   a driver for driving said motor in response to the output of said controller; and
   a switching regulator for lowering the output voltage of said power supply;
   wherein said controller is supplied with power via said switching regulator and said driver is supplied with power via said power supply.

2. The steering control apparatus as claimed in claim 1, wherein said controller, said driver and said switching regulator are housed in one and the same case.

3. The steering control apparatus as claimed in claim 1, further comprising a series regulator provided between said switching regulator and said controller.

4. The steering control apparatus as claimed in claim 1, wherein said controller and said driver are electrically grounded.

5. The steering control apparatus comprising:

a first power supply;

a second power supply for outputting a voltage lower of said first power supply;

a motor for steering control;

a controller for controlling motor; and a driver for driving said motor in response to the output of said controller;

wherein power is supplied from said first power supply to said driver and power is supplied from said second power supply to said controller;

wherein said controller and said driver are electrically insulated.

6. The steering control apparatus as claimed in claim 1, wherein said controller and said driver are electrically insulated.

* * * * *